(12) United States Patent
Huang et al.

(10) Patent No.: US 10,101,527 B2
(45) Date of Patent: Oct. 16, 2018

(54) DISPLAY DEVICE WITH NARROW BEZEL DESIGN

(71) Applicant: AU OPTRONICS CORPORATION, Hsin-chu (TW)

(72) Inventors: Tzu-Chin Huang, Hsin-chu (TW); Chia-Chun Chang, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 14 days.

(21) Appl. No.: 15/416,851

(22) Filed: Jan. 26, 2017

(65) Prior Publication Data

US 2017/0307817 A1     Oct. 26, 2017

(30) Foreign Application Priority Data

Apr. 22, 2016  (TW) .............................. 105112629 A

(51) Int. Cl.
*F21V 7/04* (2006.01)
*G02B 6/10* (2006.01)
(Continued)

(52) U.S. Cl.
CPC ................. *G02B 6/10* (2013.01); *G02B 5/10* (2013.01); *G06T 1/60* (2013.01); *G06T 3/20* (2013.01)

(58) Field of Classification Search
CPC .... G02B 5/10; G02B 6/10; G06T 1/60; G06T 3/20

See application file for complete search history.

(56) References Cited

U.S. PATENT DOCUMENTS 9,123,266 B2 *    9/2015   Bastani et al. ................. 362/605
2010/0226146 A1 *  9/2010   Chunghawa ................... 362/606

FOREIGN PATENT DOCUMENTS

CN     101770732 A     7/2010
CN     103065551 A     4/2013
(Continued)

OTHER PUBLICATIONS

Office Action issued by (TIPO) Intellectual Property Office, Ministry of Economic Affairs, R. O. C. dated Jan. 19, 2017 for Application No. 105112629, Taiwan.
(Continued)

*Primary Examiner* — Ali Alavi
(74) *Attorney, Agent, or Firm* — Tim Tingkang Xia, Esq.; Locke Lord LLP

(57) ABSTRACT

A display device includes a display panel and a light transmission layer disposed on the display panel. The display panel has an active area having a first side and a second side opposite to the first side and outputting a main image, and an auxiliary area located outside of and distributed along the first side and outputting an auxiliary image. The light transmission layer has a bottom surface facing the active area and receiving the main image. A light entrance surface and a reflective surface are located at sides of the bottom surface corresponding to the first side for receiving the auxiliary image and to the second side while inclining outward away from the bottom surface, respectively. After entering the light entrance surface, the auxiliary image is transmitted to the reflective surface and reflected outside one side of the main image corresponding to the second side via the reflective surface.

20 Claims, 9 Drawing Sheets

(51) Int. Cl.
*G02B 5/10* (2006.01)
*G06T 1/60* (2006.01)
*G06T 3/20* (2006.01)

(56) References Cited

FOREIGN PATENT DOCUMENTS

| | | |
|---|---|---|
| CN | 102637388 B | 12/2013 |
| CN | 104299519 A | 1/2015 |
| TW | 201523553 A | 6/2015 |
| TW | 201610523 A | 3/2016 |

OTHER PUBLICATIONS

Office Action issued by the State Intellectual Property Office of the Peoples Republic of China dated May 9, 2018 for Application No. CN 201610471035.2.

* cited by examiner

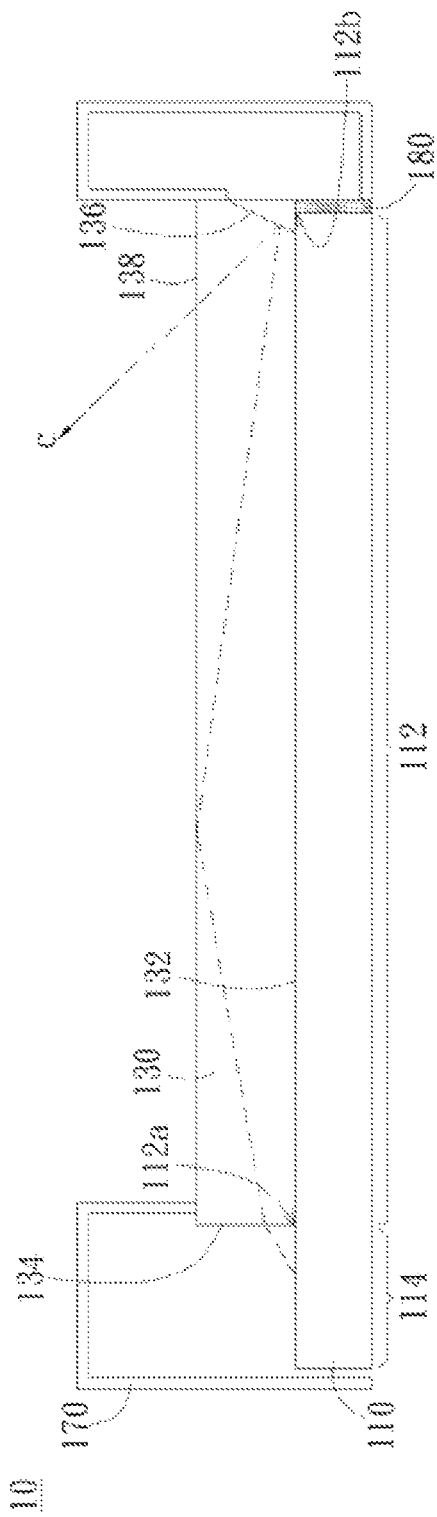
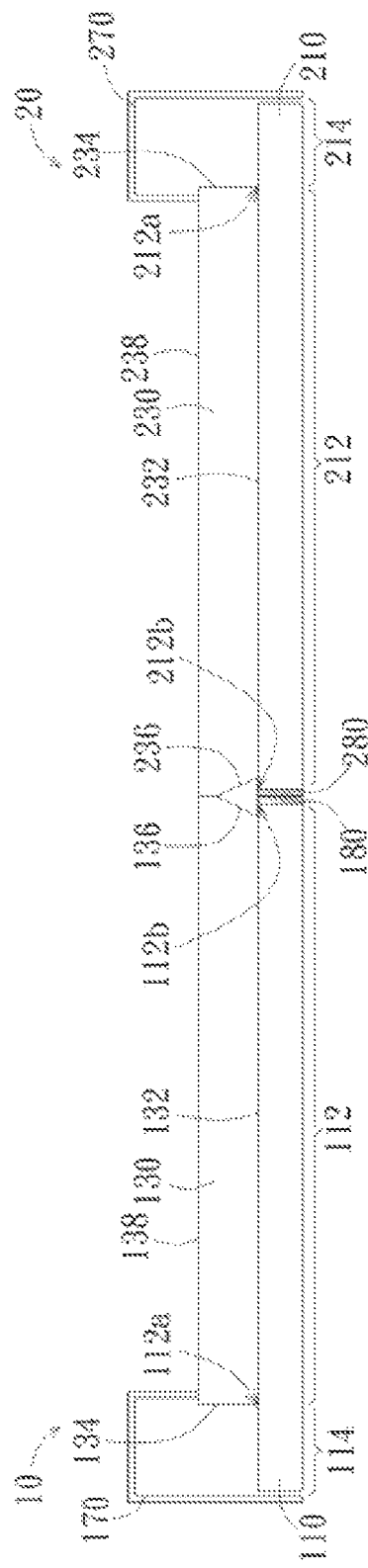
FIG. 2A
FIG. 2B

DISPLAY DEVICE WITH NARROW BEZEL DESIGN

CROSS-REFERENCE TO RELATED PATENT APPLICATION

This application claims the benefit of priority to Taiwan Patent Application No. 105112629, filed Apr. 22, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a display device, and more particularly, the present invention relates to a display device with narrow bezel design.

BACKGROUND

In recent years, narrow bezel design is always the goal to pursue for display devices, and display devices even develop to be bezel-less. Narrow-bezel or bezel-less display devices may be separately used, or may be spliced for use, to increase a display area. A manner of mosaic display devices is not limited to display devices of a same size, and assembly and transport are flexible. Mosaic display devices are widely used in exhibitions, supervision, commodity retailing, and performances. A user may perform assembly to obtain different sizes according to a requirement, or may make an adjustment according to a limitation of a site.

FIG. 1 is a schematic diagram of a conventional display device. As shown in FIG. 1, the conventional display device is obtained by splicing two display panels. A bezel 5 of a display panel 1 is adjacent to a bezel 6 of a display panel 2. A lens layer 3 is disposed on the display panel 1, and a lens layer 4 is disposed on the display panel 2. The lens layer 3 and the lens layer 4 are disposed, so that a light ray at an edge may be refracted, so as to prevent a user from seeing gaps caused by the bezels when the user views the display device right from the front (for example, at a location A). However, when an angle of view increases (for example, at a location B), gaps between images are still visible.

In addition, edges of the lens layer 3 and the lens layer 4 are curved, and reflected light (from environmental light) occurs easily at the edges to affect a visual effect. Structurally speaking, a curved surface causes an uneven surface of the display device and makes it impossible to apply an anti-reflection film, and display quality is affected. As can be seen from the foregoing description, the conventional display device still needs to be improved.

SUMMARY

An objective of the present invention is to provide a display device with a narrow bezel effect.

Another objective of the present invention is to provide a display device, which can eliminate seams between images during splicing for use, so as to provide an image with continuity.

A display device includes a display panel and a light transmission layer. The display panel has an active area outputting a main image and an auxiliary area outputting an auxiliary image. The active area has a first side and a second side opposite to the first side. The auxiliary area is located outside of the first side and distributed along the first side. The light transmission layer is disposed on the display panel and has a bottom surface. The bottom surface faces the active area and receives the main image. A light entrance surface is located at one side of the bottom surface corresponding to the first side for receiving the auxiliary image. A reflective surface is located at one side of the bottom surface corresponding to the second side and inclines outward in a direction away from the bottom surface. After entering the light entrance surface, the auxiliary image is transmitted to the reflective surface and then reflected outside one side of the main image corresponding to the second side via the reflective surface.

A display device includes a display panel and a light transmission layer. The display panel has an active area and an auxiliary area. The active area has a first side and a second side opposite to the first side. The auxiliary area is located outside of the first side and distributed along the first side. The light transmission layer is disposed on the display panel and has a bottom surface. The bottom surface covers the active area and exposes the auxiliary area. A light entrance surface is located at one side of the bottom surface corresponding to the first side, and an included angle exists between the light entrance surface and the auxiliary area. A reflective surface is located at one side of the bottom surface corresponding to the second side and inclines outward in a direction away from the bottom surface.

A mosaic display device includes a first display panel and a second display panel. The first display panel has a first active area outputting a first main image and a first auxiliary area outputting a first auxiliary image. The first auxiliary area is located outside a first side of the first active area. The second display panel has a second active area that is adjacent to the first active area and outputs a second main image. A second auxiliary area is located at one side of the second active area opposite to the first active area and outside a third side of the second active area. A light transmission layer is disposed on the first display panel and the second display panel above, and has a bottom surface, a first light entrance surface, a second light entrance surface, a first reflective surface, and a second reflective surface. The bottom surface faces the first active area and the second active area and receives the first main image and the second main image. The first light entrance surface receives the first auxiliary image, and the second light entrance surface receives a second auxiliary image. The first reflective surface is located at one side of the bottom surface corresponding to a second side of the first active area, and inclines towards the second display panel in a direction away from the bottom surface. The second reflective surface is located at one side of the bottom surface corresponding to a fourth side of the second active area, and inclines towards the first display panel in a direction away from the bottom surface.

The display device of the present invention eliminates a gap between images by means of a combination of a display panel and a light transmission layer, thereby improving display quality.

BRIEF DESCRIPTION OF THE DRAWINGS

FIG. 2A is a schematic diagram of an embodiment of a display device according to the present invention;

FIG. 2B is a schematic diagram of another embodiment of the display device according to the present invention;

DETAILED DESCRIPTION

Figure 1:
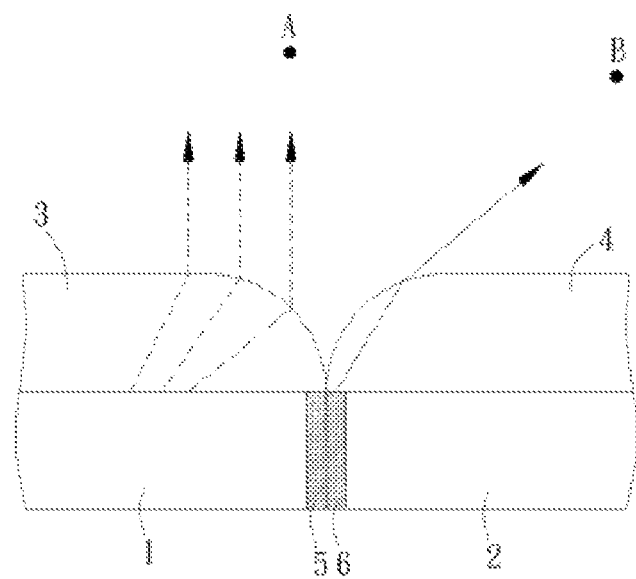
FIG. 1 is a schematic diagram of a conventional display device.

The present invention provides a display device, having a narrow-bezel or bezel-less display effect. Refer to FIG. 2A, FIG. 2A is a schematic diagram of an embodiment of a display device 10 according to the present invention. As shown in FIG. 2A, the display device 10 is formed of a single display panel 110. The display device 10 includes the display panel 110 and a light transmission layer 130 disposed on the display panel 110. The display panel 110 has an active area 112 and an auxiliary area 114. An outer frame 170 covers an outside of the display device 10.

Preferably, the active area 112 and the auxiliary area 114 are respectively formed by combining pixels located at different areas on the display panel 110. The active area 112 has a first side 112a and a second side 112b opposite to the first side 112a. The auxiliary area 114 is located outside the first side 112a and distributed along the first side 112a. In addition, the display panel 110 may perform display in a self-emission manner or a non-self-emission manner, for example, may be an organic light-emitting diode display panel, a liquid crystal panel, or the like.

As shown in FIG. 2A, the light transmission layer 130 has a bottom surface 132, a light entrance surface 134, and reflective surface 136. The light transmission layer 130 may be made of, for example, polymethyl methacrylate (PMMA). The bottom surface 132 covers the active area 112 and exposes the auxiliary area 114. The light entrance surface 134 is located at one side of the bottom surface 132 corresponding to the first side 112a, and an included angle exists between the light entrance surface 134 and the auxiliary area 114. For example, the included angle between the light entrance surface 134 and the auxiliary area 114 is 90 degrees, but is not limited thereto. The reflective surface 136 is located on one side of the bottom surface 132 corresponding to the second side 112b and inclines outward in a direction away from the bottom surface 132. As shown in FIG. 2A, the reflective surface 136 inclines towards a bezel 180 (outside) from a side near the bottom surface 132 to a side away from the bottom surface 132.

As shown in FIG. 2A, a light ray c generated by the auxiliary area 114 enters the entrance transmission layer 130 from the light entrance surface 134, is then transmitted to the reflective surface 136 in a total reflection travel manner, and is then reflected to a top surface 138 via the reflective surface 136 and is output. In the embodiment shown in FIG. 2A, the light ray c is output from the auxiliary area 114 and then directly enters the light entrance surface 134 in an inclined manner. Light rays output by the auxiliary area 114 and the active area 112 may be adjusted to have different brightness. For example, the brightness of the light ray output by the auxiliary area is adjusted to be higher, to enable the light rays output by the auxiliary area and the active area via the top surface to have consistent brightness.

In addition, the display device may also be used for spliced display. Referring to FIG. 2B, FIG. 2B is a schematic diagram of an embodiment of a display device according to the present invention. As shown in FIG. 2B, the display panel 110 of the display device 10 and a display panel 210 of a display device 20 are spliced. That is, the display panel 110 is used as a first display panel, and the display panel 210 is used as a second display panel. Similarly, the display device 20 includes the display panel 210 and a light transmission layer 230 disposed on the display panel 210. The display panel 210 has an active area 212 and an auxiliary area 214.

Generally, the active area 112 is used as a first active area of a mosaic display device, and the active area 212 is used as a second active area. The auxiliary area 114 is used as a first auxiliary area of the mosaic display device, and the auxiliary area 214 is used as a second auxiliary area. The active area 212 has a third side 212a and a fourth side 212b opposite to the third side 212a and the corresponding active area 112 is disposed along the second side 112b (the active area 212 is nearer to the active area 112 than the auxiliary area 214 is). The auxiliary area 214 is located at one side of the active area 212 opposite to the active area 112. As shown in FIG. 2B, the auxiliary area 214 is located outside the third side 212a and distributed along the third side 212a. In addition, a bezel 280 of the display panel 210 is adjacent the bezel 180 of the display panel 110. The outer frame 170 and an outer frame 270 cover outsides of the display device 10 and the display device 20. It should be noted that for ease of representation, the outer frames are respectively represented by using different numerals. The outer frame 170 and the outer frame 270 are an integrated structure and are used together as frames of two display devices.

As shown in FIG. 2B, the light transmission layer 230 has a bottom surface 232, a light entrance surface 234, a reflective surface 236. The bottom surface 232 covers the active area 212 and exposes the auxiliary area 214. The light entrance surface 234 is located at one side of the bottom surface 232 corresponding to the third side 212a, and an included angle exists between the light entrance surface 234 and the auxiliary area 214. The reflective surface 236 is located at one side of the bottom surface 232 corresponding to the fourth side 212b, and inclines outward in a direction away from the bottom surface 232 (that is, inclines towards the display panel 110). As shown in FIG. 2B, the reflective surface 236 inclines towards the bezel 280 (outside) from a side near the bottom surface 232 to a side away from the bottom surface 232. In addition, the light transmission layer 130 of the display panel 110 is adjacent to the light transmission layer 230 of the display panel 210.

It should be added that the light transmission layer 230 and the light transmission layer 130 may be disposed on the display panel 210 and the display panel 110 respectively and are then sliced and combined. In another embodiment, the light transmission layer 230 and the light transmission layer 130 may also be a whole, and the light transmission layer (130, 230) is disposed on the display panel 110 and the display panel 210. For the light transmission layer (130, 230), the length and width of cutting may depend on the size of splicing, and the locations where the reflective surface 136 and the reflective surface 236 are to be formed depend on the locations of the bezel 180 and the bezel 280.

Figure 2C:
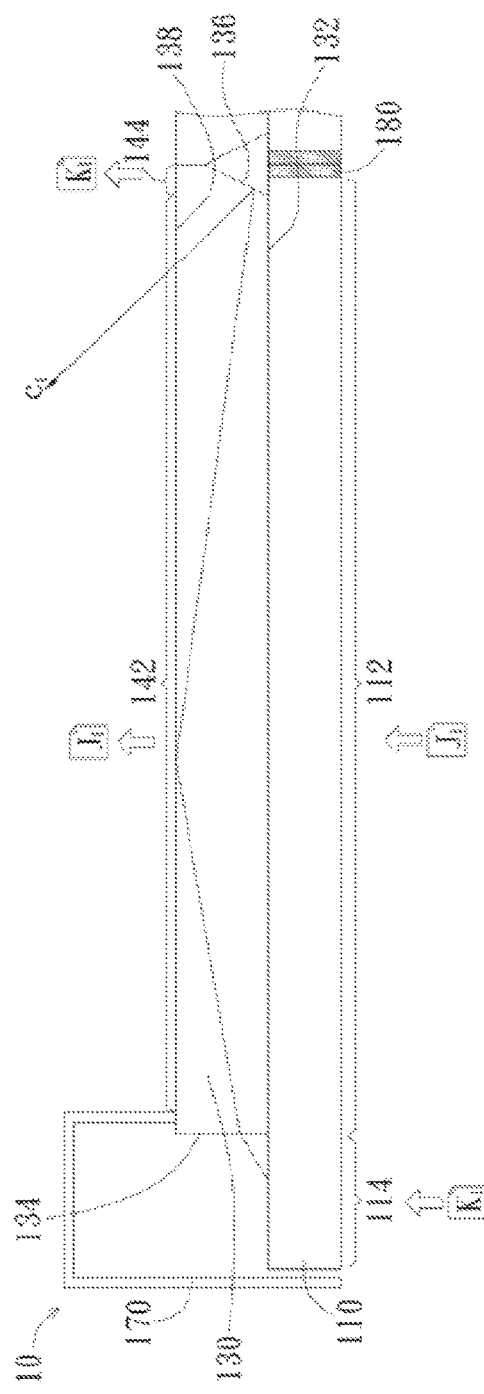
FIG. 2C and FIG. 2D are partial enlarged diagrams of the display device in FIG. 2B.
Figure 2D:
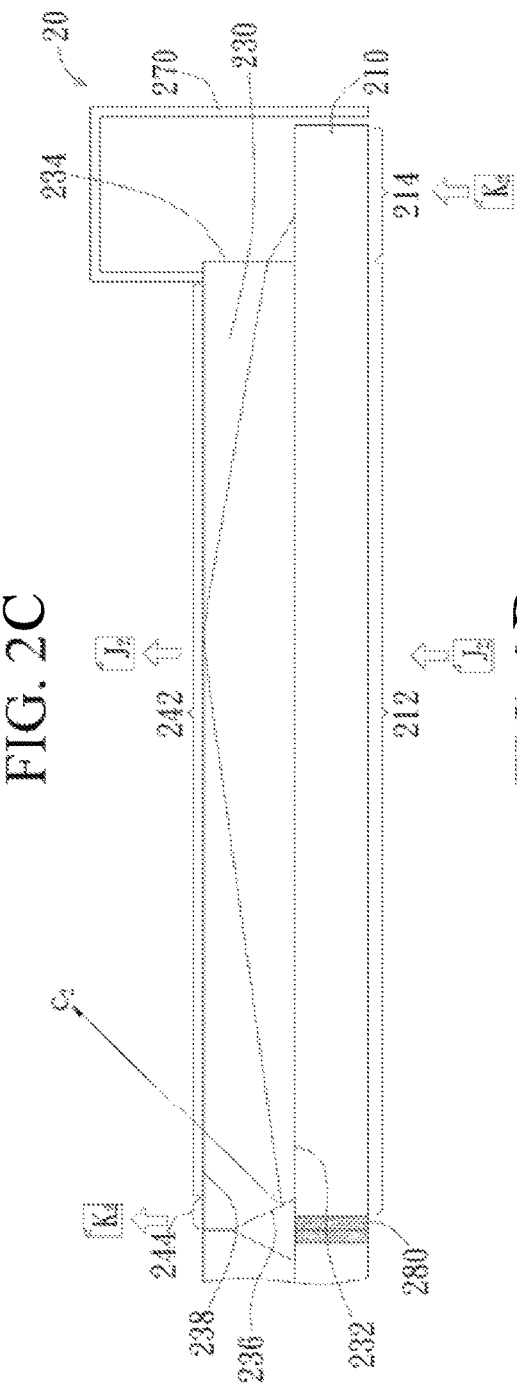

FIG. 2C is a partial enlarged diagram of the display device 10 in FIG. 2B. As shown in FIG. 2B, the light transmission layer 130 includes the top surface 138 and the bottom surface 132 opposite to the top surface 138. As shown in FIG. 2C, a light ray $c_1$ generated by the auxiliary area 114 enters the light transmission layer 130 from the light entrance surface 134, is then transmitted to the reflective surface 136 in a total reflection travel manner, and is then reflected to the top surface 138 via the reflective surface 136 and is output. A transmission manner of a light ray in the display device 20 is the same as the foregoing manner. As shown in FIG. 2D, a light ray $c_2$ generated by the auxiliary area 214 enters the light transmission layer 230 from the light entrance surface 234, is then transmitted to the reflective surface 236 in a total reflection travel manner, and is then reflected to the top surface 238 via the reflective surface 236 and is output.

In the embodiment shown in FIG. 2C and FIG. 2D, the light ray $c_1/c_2$ is output from the auxiliary area 114/214 and then directly enters the light entrance surface 134/234 in an inclined manner. The light rays output by the auxiliary area 114/214 and the active area 112/212 may be adjusted to have different brightness. For example, the brightness of the light ray output by the auxiliary area is adjusted to be higher, to enable the light rays output by the auxiliary area and the active area via the top surface to have consistent brightness. To increase light transmission efficiency, refractive indices of the light transmission layer 130 and the light transmission layer 230 are preferably greater than 1.325. Therefore, the overall thickness of the display device may be further reduced.

For image display, by using the display panel 110 as an example, the active area 112 of the display panel 110 outputs a main image $J_1$, and the auxiliary area 114 outputs an auxiliary image $K_1$. The bottom surface 132 of the light transmission layer 130 faces the active area 112 and receives the main image $J_1$. The light entrance surface 134 receives the auxiliary image $K_1$. In particular, after entering the bottom surface 132, the main image $J_1$ is output from an image output area 142. After entering the light entrance surface 134, the auxiliary image $K_1$ is transmitted to the reflective surface 136, and is then reflected outside one side of the main image $J_1$ corresponding to the second side 112b (output from an image output area 144) via the reflective surface 136.

Similarly, referring to FIG. 2D, in the display device 20, the active area 212 of the display panel 210 outputs a main image $J_2$, and the auxiliary area 214 outputs an auxiliary image $K_2$. The bottom surface 232 of the light transmission layer 230 faces the active area 212 and receives the main image $J_2$. The light entrance surface 234 receives the auxiliary image $K_2$. In particular, after entering the bottom surface 232, the main image $J_2$ is output from an image output area 242. After entering the light entrance surface 234, the auxiliary image $K_2$ is transmitted to the reflective surface 236, and is then reflected outside one side of the main image $J_2$ corresponding to the fourth side 212b (from image output area 244 output) via the reflective surface 236.

In brief, the auxiliary image $K_1$ is generated at a location outside the first side, is guided by the light transmission layer 130, and is converted outside the second side of the other side. Therefore, the auxiliary image $K_1$ is reflected to one side of the main image $J_1$ corresponding to the second side via the reflective surface, and is output via the top surface together with the main image $J_1$. In another aspect, the auxiliary image $K_2$ is generated at a location outside a third side, is guided by the light transmission layer 230, and is converted outside the fourth side of the other side. Therefore, the auxiliary image $K_2$ is reflected to one side of the main image $J_2$ corresponding to the fourth side via the reflective surface, and is output via the top surface together with the main image $J_2$. In the embodiment shown in FIG. 2C and FIG. 2D, the auxiliary image $K_1/K_2$ is output from the auxiliary area 114/214 and then directly enters the light entrance surface 134/234 in an inclined manner. As discussed above, the brightness of the image may be adjusted to different brightness according to a different display area, to enable image brightness of a main image and an auxiliary image output from the top surface to be consistent.

By means of this design, an auxiliary image is guided by using the light transmission layer to fill gaps caused by bezels between display panels, and a reflective surface is used to provide a seamless image for a viewer at a different angle of view, thereby improving a display effect. In addition, as shown in FIG. 2B, the display device 10 has an even surface, that is, the top surface 138 of the light transmission layer 130 and the top surface 238 of the light transmission layer 230 are co-planar. As compared with a conventional display device, the display device of the present invention may reduce reflective light between two display panels that is caused by environmental light. In addition, the display device of the present invention also provides a structure with desirable compatibility. Because the display device has an even surface, it may be convenient to apply an anti-reflection film, thereby improving display quality.

Figure 3A:
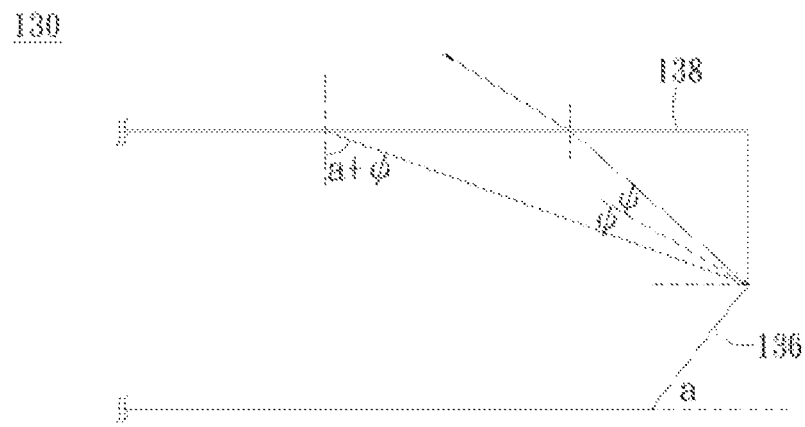
FIG. 3A and FIG. 3B are schematic enlarged diagrams of a light transmission layer and light path transmission.
Figure 3B:
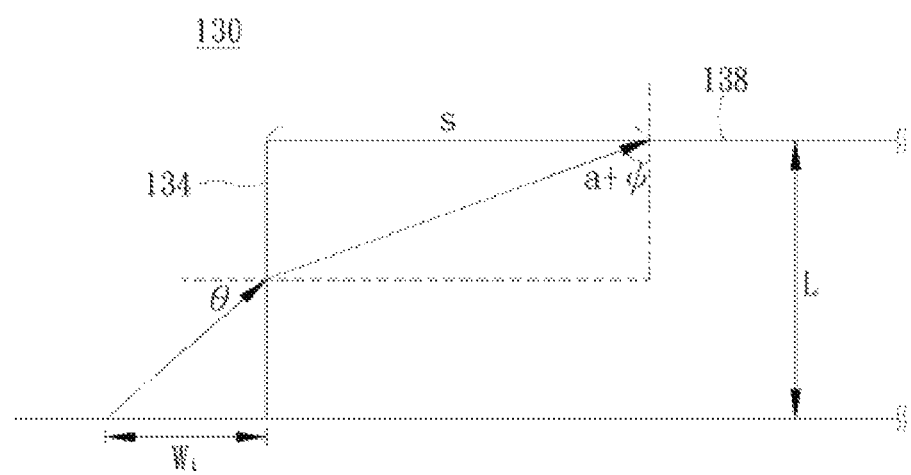

Specifically, a horizontal distance between a light ray generated by an auxiliary image and a light entrance surface is related to the thickness of the light transmission layer and a cotangent of a basic angle of a reflective surface. Referring to FIG. 3A and FIG. 3B, FIG. 3A and FIG. 3B are schematic enlarged diagrams of a light transmission layer 130 and light path transmission. As shown in FIG. 3A, at a side of the light transmission layer 130 near a reflective surface 136, a basic angle of the reflective surface 136 is a, an incident angle/reflection angle of a light ray on the reflective surface 136 is φ, and it may be known that a reflection angle of total internal reflection of the light ray on the light transmission layer 130 is a+φ.

In FIG. 3B, as can be seen from above, an incident angle of total reflection is also a+φ. In addition, as shown in FIG. 3B, an incident angle at which a light ray enters a light entrance surface 134 is θ, a horizontal distance from the light ray to the light entrance surface 134 is $W_1$, a horizontal distance after the light ray is refracted is s, and the thickness of the light transmission layer 130 is L. A horizontal distance $W_1$ from a light ray generated by an auxiliary image to the light entrance surface 134 has the following relationship:

$$W_1 = \frac{L - s \cot(a + \varphi)}{\tan\theta}$$

where a drop point of an incident light ray at a different angle of view may be determined by using the foregoing expression, and the size of the basic angle of the reflective surface may be adjusted according to the thickness of a required light transmission layer.

Figure 4:
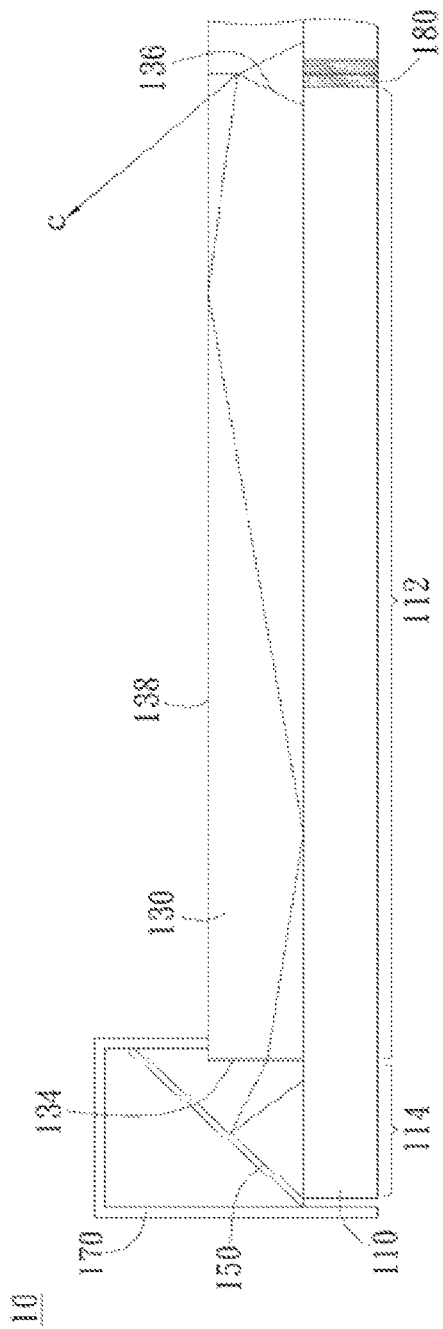
FIG. 4, FIG. 5, and FIG. 6 are schematic diagrams of different embodiments of a display device according to the present invention.
Figure 5:
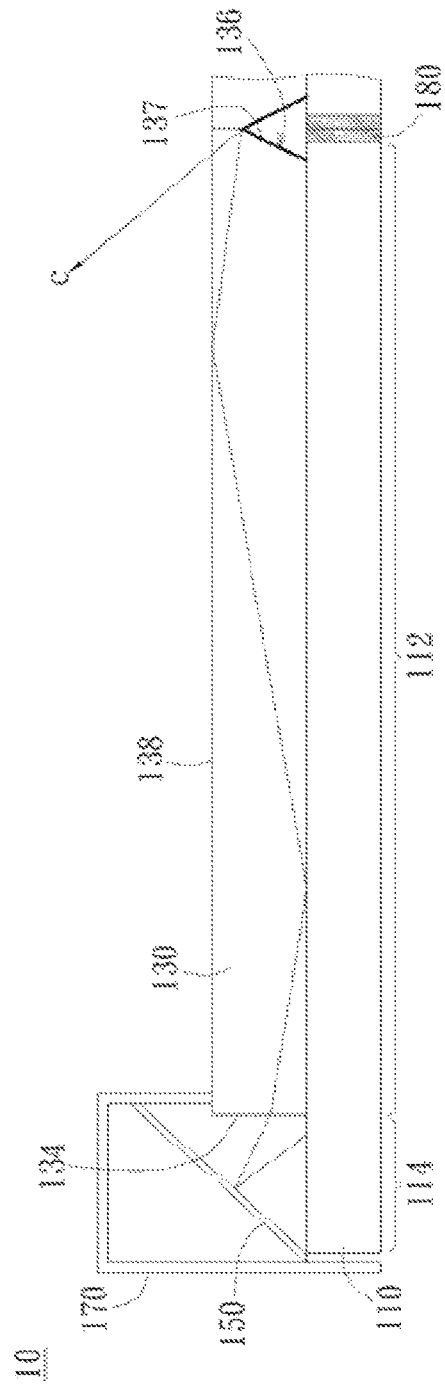
Figure 6:
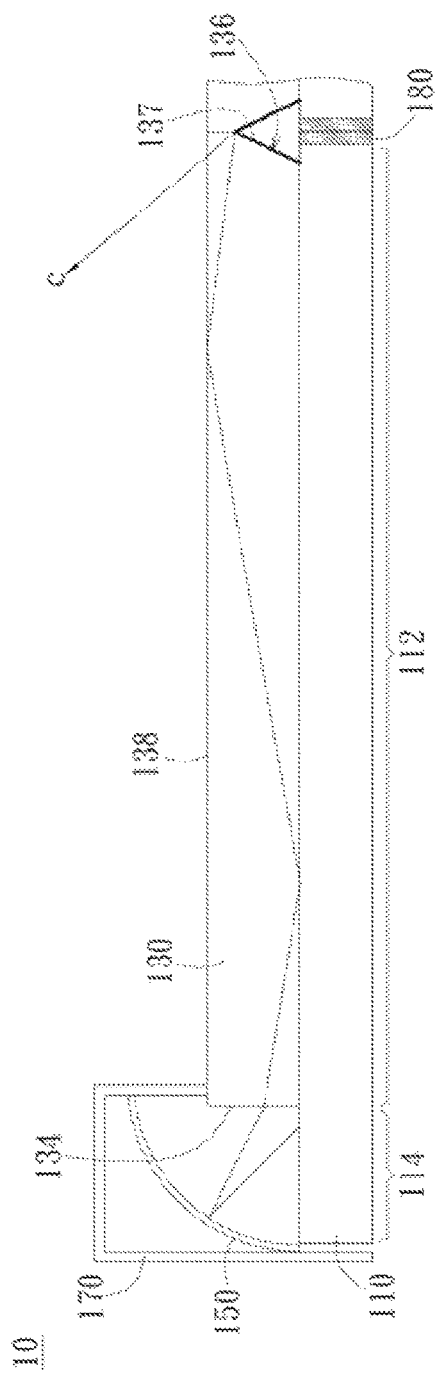

FIG. 4 to FIG. 6 are schematic diagrams of different embodiments of a display device 10 of the present invention.

As shown in FIG. 4, a reflector 150 is disposed at the display device 10 along a light entrance surface 134, and the reflector 150 covers an auxiliary area 114. A light ray c is output from the auxiliary area 114 and is then reflected by the reflector 150 to enter the light entrance surface 134. The light ray c is then transmitted to a reflective surface 136, and is then reflected to a top surface 138 via the reflective surface 136 and is output. In other words, in the embodiment shown in FIG. 4, the light ray c is output from the auxiliary area 114, is reflected by the reflector 150, and then enters the light entrance surface 134. For image display, an auxiliary image is output from the auxiliary area 114, is reflected by the reflector 150, enters the light entrance surface 134, is reflected outside one side of a main image corresponding to a second side 112b via the reflective surface 136, and is then output via the top surface 138 together with the main image. In addition, in a display device 20, a reflector may also be disposed in the foregoing manner. In brief, a reflector is disposed along the light entrance surface 234 shown in FIG. 2B, and the reflector covers an auxiliary area 214. Therefore, the auxiliary image is output from the auxiliary area 214, is then reflected by reflector, and enters the light entrance surface 234. The reflector is disposed, so that the brightness of a light ray after the auxiliary image is output from the top surface may be increased, and a brightness difference between the auxiliary image and the main image may be reduced.

As shown in FIG. 5, the reflector 150 is disposed at the display device 10 along the light entrance surface 134, and the reflector 150 covers the auxiliary area 114. In addition, the reflective surface 136 has a coating layer 137 formed of a mirror coating. By means of the coating layer 137, the reflectance may be further increased. In the embodiment shown in FIG. 6, for the display device 10, the reflector 150 in the form of a curved surface is used. Specifically, the surfaces of the reflector 150 opposite to the auxiliary area 114 are all concave curved surfaces. Therefore, light rays c generated by the auxiliary area 114 become parallel as much as possible after being reflected by the concaved-type reflector 150, to maintain a size proportion of an output image. Optionally, as shown in FIG. 6, in the display device 20, a reflector with a concave curved surface may also be disposed in the foregoing manner. In another embodiment, for the coating layer 137, a material having effects of high diffusion and evenness may be selected, thereby reducing differences of images seen for different angles of view.

Figure 7:
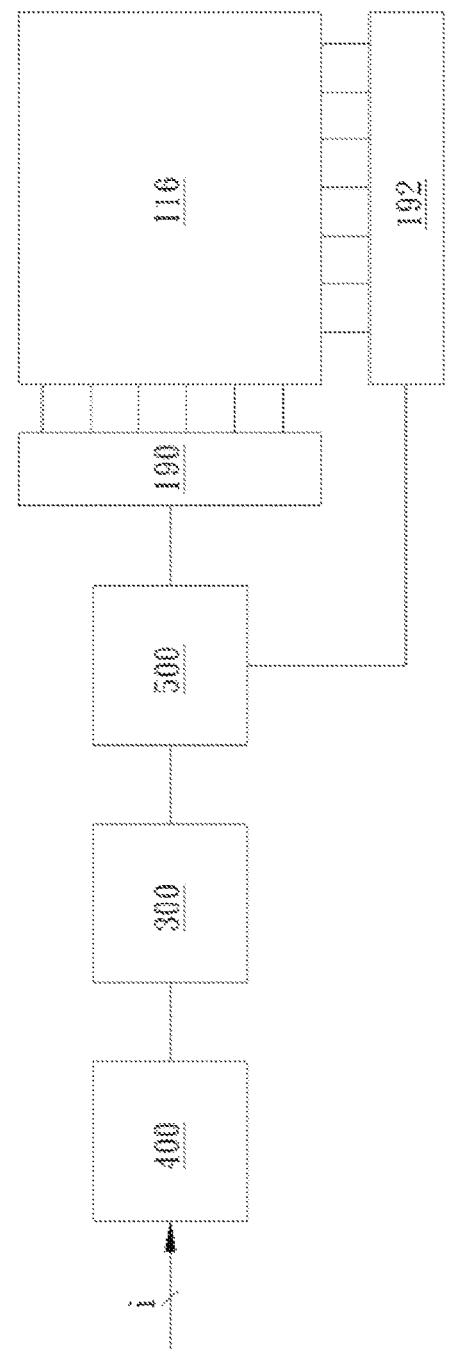
FIG. 7 is a block diagram of an embodiment of a display device according to the present invention.

FIG. 7 is a block diagram of an embodiment of a display device 10 according to the present invention. As shown in FIG. 7, the display device 10 includes an image processing module 300, an image signal receiving unit 400, and a clock control unit 500. The image signal receiving unit 400 receives an original image signal i, and transfers the original image signal i to the image processing module 300 to perform image cutting. Next, the clock control unit 500 respectively outputs driving signals to a gate driver 190 and a source driver 192, to generate a processed image in a display area 116. The display area 116 includes the foregoing active area and auxiliary area. For a display device using a mosaic display, the display area 116 includes active areas and auxiliary areas of different panels.

Figure 8:
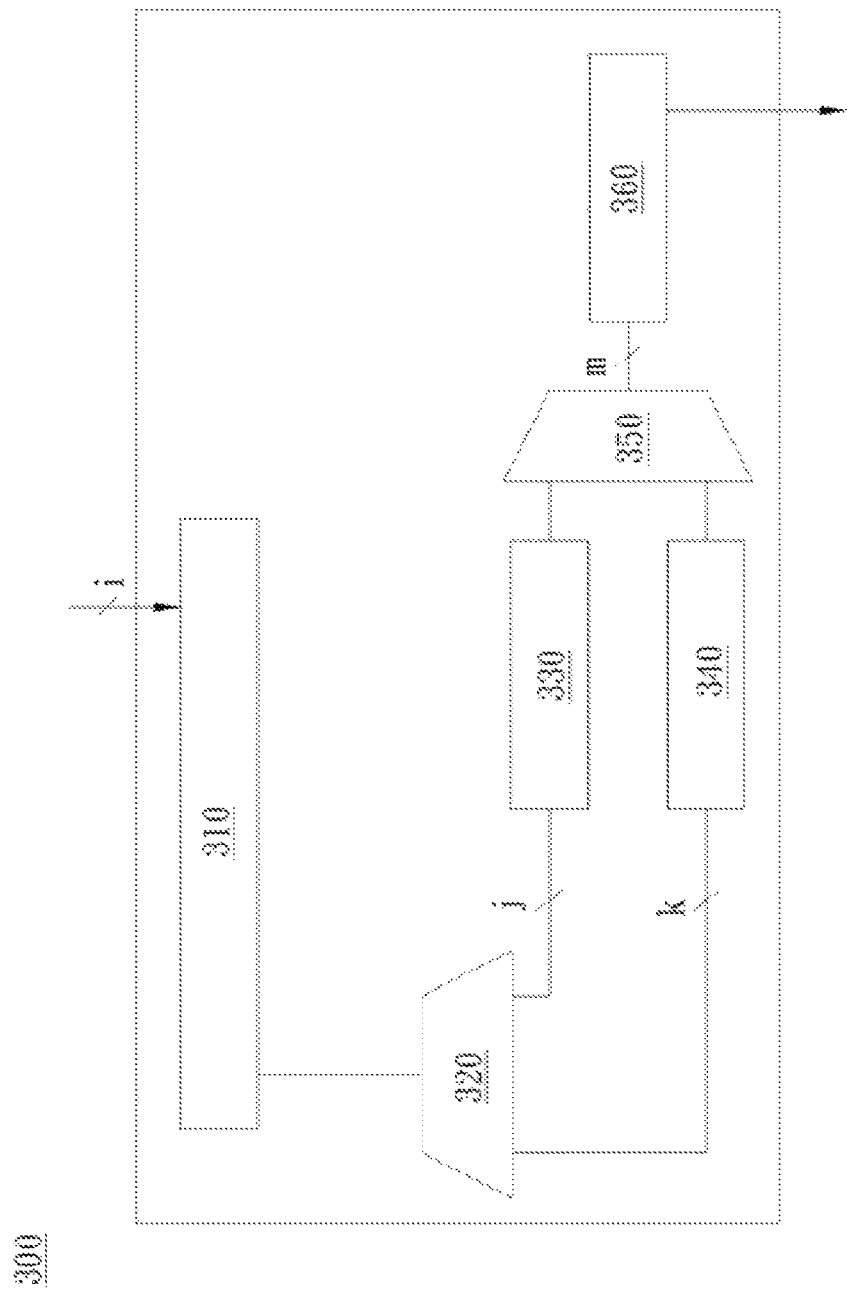
FIG. 8 is a block diagram of an embodiment of an image processing module.

Further, referring to FIG. 8, FIG. 8 is a block diagram of an embodiment of the image processing module 300. As shown in FIG. 8, the image processing module 300 includes a demultiplexer 320, a multiplexer 350, and multiple buffers (310, 330, 340, 360). The first buffer 310 stores the original image signal i. The demultiplexer 320 receives the original image signal i and cuts the original image signal i into a main image signal j and a sideband image signal k. The main image signal j obtained from cutting by the demultiplexer 320 is stored in the second buffer 330, and the sideband image signal k obtained from cutting by the demultiplexer 320 is stored in the third buffer 340. Next, the multiplexer 350 recombines the main image signal j and the sideband image signal k into a recombined image signal m. The fourth buffer 360 stores the recombined image signal m. The recombined image signal m passes through the foregoing clock control unit to generate a recombined image in the display area.

Figure 9A:
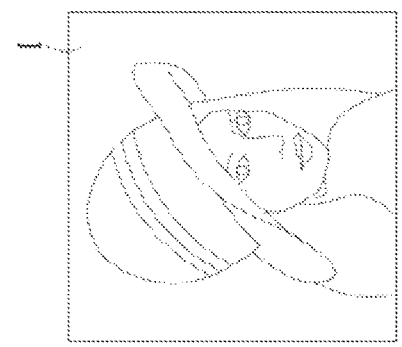
FIG. 9A to FIG. 9F are schematic diagrams of image recombination by an image processing module.

FIG. 9A to FIG. 9F are schematic diagrams of image recombination by an image processing module. FIG. 9A shows display areas formed of different display panels. A display area has an active area 112 and an active area 212. An auxiliary area 114 is distributed along a first side 112a outside the active area 112. An auxiliary area 214 is distributed along a third side 212a outside the active area 212. An area (shown by slanted lines) of a corresponding bezel is provided between the active area 112 and the active area 212 and is distributed along a second side 112b (or a fourth side 212b).

Figure 9B:
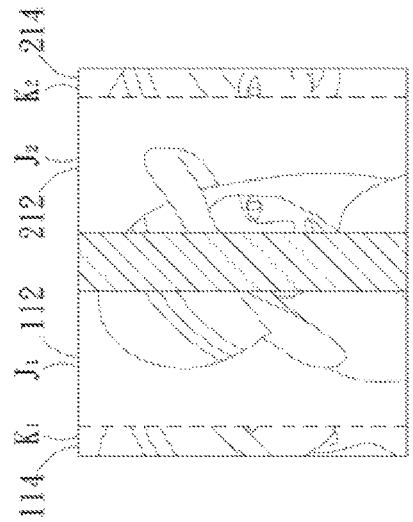
Figure 9C:
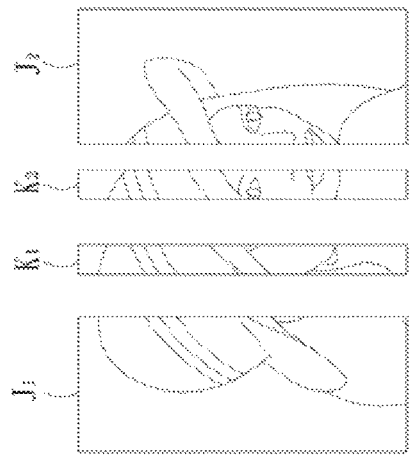

As discussed above, the image processing module receives an original image signal. As shown in FIG. 9B, the original image signal corresponds to an original image I. Referring to FIG. 9A and FIG. 9C, according to the division of the active area (112, 212) and the auxiliary area (114, 214), a demultiplexer cuts the original image I into main images ($J_1$, $J_2$) (corresponding to main image signals) and an auxiliary image ($K_1$, $K_2$) (corresponding to sideband image signals). In this case, the auxiliary image $K_1$ is located outside one side corresponding to the second side 112b, and the auxiliary image $K_2$ is located outside one side corresponding to the fourth side 212b.

Figure 9D:
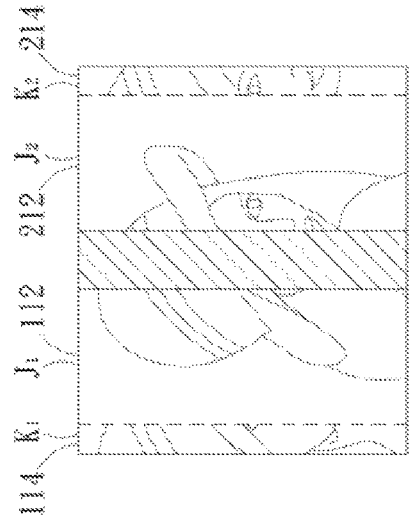

As shown in FIG. 9D, the image processing module rearranges image locations of the main image signals and image locations of the sideband image signals, and transfers the main image signals and the sideband image signals respectively to the active area (112, 212) and the auxiliary area (114, 214), to respectively generate a main image and an auxiliary image. Referring to FIG. 9A and FIG. 9D, the main image $J_1$ is located at the active area 112, the auxiliary image $K_1$ is located outside one side corresponding to the first side 112a, that is, located at the auxiliary area 114. The main image $J_2$ is located at the active area 212, the auxiliary image $K_2$ is located outside one side corresponding to the third side 212a, that is, located at the auxiliary area 214. A recombined main image signal and a recombined sideband image signal are output to a display panel.

Figure 9E:
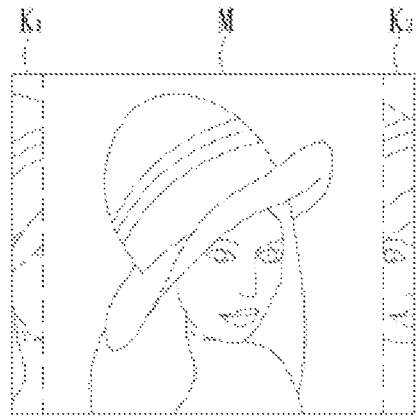
Figure 9F:
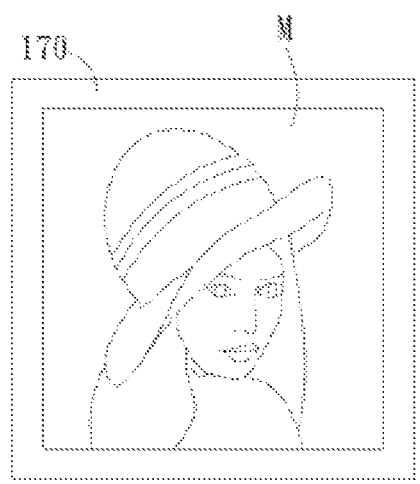

Next, a light transmission layer is used to guide the auxiliary images ($K_1$, $K_2$) at two sides to a location of a bezel. As shown in FIG. 9D and FIG. 9E, the light transmission layer rearranges an image location of the sideband image signal. Referring to FIG. 9A and FIG. 9E, by using the light transmission layer, the auxiliary image $K_1$ is located outside one side of the second side 112b, and the auxiliary image $K_2$ is located outside one side of the fourth side 212b. Referring to FIG. 9B and FIG. 9E, a processed image M reproduces content of the original image I, and covers a seam formed at a location of a bezel, thereby avoiding image discontinuity. Finally, as shown in FIG. 9F, a portion other than the image M of an outer frame 170 is covered to keep the image to be displayed.

In conclusion, for the display device of the present invention, an image is cut and arranged by using an image processing module, and a location of the image is adjusted by using a light transmission layer, so as to provide the image with continuity. An anti-reflection film may also be applied on the light transmission layer of the present invention, thereby further improving display quality.

The present invention is described by using the foregoing related embodiments; however, the foregoing embodiments are merely examples of implementing the present invention. It should be pointed out that the disclosed embodiments do not limit the scope of the present invention. On the contrary, modifications and equivalent settings included in the spirit and scope of the claims all fall within the scope of the present invention.

What is claimed is:

1. A display device, comprising:
    a display panel, comprising:
        an active area, outputting a main image, the active area having a first side and a second side opposite to the first side; and
        an auxiliary area, outputting an auxiliary image, the auxiliary area being located outside of the first side and being distributed along the first side; and
    a light transmission layer, disposed on the display panel, and comprising:
        a bottom surface, facing the active area and receiving the main image;
        a light entrance surface, located at one side of the bottom surface corresponding to the first side for receiving the auxiliary image;
        a reflector disposed along the light entrance surface, and covering the auxiliary area, wherein a reflecting space is formed between the reflector, the auxiliary area and the light entrance surface, and wherein the auxiliary image is output from the auxiliary area, reflected by the reflector, and enters the light entrance surface; and
        a reflective surface, located at one side of the bottom surface corresponding to the second side and inclining outward in a direction away from the bottom surface, wherein
    after entering the light entrance surface, the auxiliary image is transmitted to the reflective surface and then reflected outside one side of the main image corresponding to the second side via the reflective surface.

2. The display device according to claim 1, wherein the light transmission layer comprises a top surface opposite to the bottom surface, and the auxiliary image is reflected to one side of the main image corresponding to the second side via the reflective surface and is output via the top surface together with the main image.

3. The display device according to claim 1, wherein the auxiliary image is output from the auxiliary area and then directly enters the light entrance surface in an inclined manner.

4. The display device according to claim 1, wherein curved surfaces of the reflector opposite to the auxiliary area are all concave.

5. The display device according to claim 1, further comprising an image processing module, wherein the image processing module receives an original image signal, cuts the original image signal into a main image signal and a sideband image signal whose image location corresponds to an outside of one side of the main image signal corresponding to the second side, and transfers the main image signal and the sideband image signal to the active area and the auxiliary area respectively to generate the main image and the auxiliary image respectively.

6. The display device according to claim 5, wherein the image processing module rearranges the image location of the sideband image signal outside one side of the main image signal corresponding to the first side, to recombine the main image signal and the sideband image signal into a recombined image signal, and outputs the recombined image signal to the display panel.

7. The display device according to claim 6, wherein the image processing module comprises:
    a first buffer, storing the original image signal;
    a demultiplexer, cutting the original image signal into the main image signal and the sideband image signal;
    a second buffer, storing the main image signal obtained from cutting by the demultiplexer;
    a third buffer, storing the sideband image signal obtained from cutting by the demultiplexer; and
    a multiplexer, recombining the main image signal and the sideband image signal into the recombined image signal.

8. A display device, comprising:
    a display panel, comprising:
        an active area, having a first side and a second side opposite to the first side; and
        an auxiliary area, located outside of the first side, and distributed along the first side; and
    a light transmission layer, disposed on the display panel, and comprising:
        a bottom surface, covering the active area and exposing the auxiliary area;
        a light entrance surface, located at one side of the bottom surface corresponding to the first side, and an included angle existing between the light entrance surface and the auxiliary area;
        a reflector disposed along the light entrance surface, and covering the auxiliary area, wherein a reflecting space is formed between the reflector, the auxiliary area and the light entrance surface, and wherein the light ray is output from the auxiliary area, reflected by the reflector, and enters the light entrance surface; and
        a reflective surface, located at one side of the bottom surface corresponding to the second side and inclining outward in a direction away from the bottom surface.

9. The display device according to claim 8, wherein curved surfaces of the reflector opposite to the auxiliary area are all concave.

10. The display device according to claim 8, wherein the light transmission layer comprises a top surface opposite to the bottom surface, the auxiliary area generates a light ray, and the light ray enters the light transmission layer from the light entrance surface, is transmitted to the reflective surface, is then reflected to the top surface via the reflective surface and is output.

11. The display device according to claim 10, wherein the light ray is output from the auxiliary area and then directly enters the light entrance surface in an inclined manner.

12. The display device according to claim 8, further comprising an image processing module, wherein the image processing module receives an original image signal, cuts the original image signal into a main image signal and a sideband image signal whose image location corresponds to an outside of one side of the main image signal corresponding to the second side, and transfers the main image signal and the sideband image signal to the active area and the auxiliary area respectively.

13. The display device according to claim 12, wherein the image processing module rearranges the image location of the sideband image signal outside one side of the main image signal corresponding to the first side, to recombine the main image signal and the sideband image signal into a recombined image signal, and outputs the recombined image signal to the display panel.

14. The display device according to claim 13, wherein the image processing module comprises:
a first buffer, storing the original image signal;
a demultiplexer, cutting the original image signal into the main image signal and the sideband image signal;
a second buffer, storing the main image signal obtained from cutting by the demultiplexer;
a third buffer, storing the sideband image signal obtained from cutting by the demultiplexer; and
a multiplexer, recombining the main image signal and the sideband image signal into the recombined image signal.

15. A mosaic display device, comprising:
a first display panel, comprising:
a first active area, outputting a first main image, the first active area having a first side and a second side opposite to the first side; and
a first auxiliary area, outputting a first auxiliary image, the first auxiliary area being located outside of the first side, and distributed along the first side;
a second display panel, comprising:
a second active area, disposed corresponding to the first active area along the second side, and outputting a second main image, the second active area having a third side and a fourth side opposite to the third side; and
a second auxiliary area, located at one side of the second active area opposite to the first active area, and outputting a second auxiliary image, the second auxiliary area being located outside the third side of the second active area, and being distributed along the third side; and
a light transmission layer, disposed on the first display panel and the second display panel, and comprising:
a bottom surface, facing the first active area and the second active area and receiving the first main image and the second main image;
a first light entrance surface, located at one side of the bottom surface corresponding to the first side of the first active area, and receiving the first auxiliary image;
a second light entrance surface, located at one side of the bottom surface corresponding to the third side of the second active area, and receiving the second auxiliary image;
two reflectors disposed along the first light entrance surface and the second light entrance surface, and respectively covering the first auxiliary area and the second auxiliary area, wherein a first reflecting space is formed between the reflector covering the first auxiliary area, the first auxiliary area and the first light entrance surface, and a second reflecting space is formed between the reflector covering the second auxiliary area, the second auxiliary area and the second light entrance surface, and wherein the first auxiliary image is output from the first auxiliary area, is then reflected by the reflector covering the first auxiliary area, and enters the first light entrance surface; and the second auxiliary image is output by the second auxiliary area, is then reflected by the other reflector, and enters the second light entrance surface;

a first reflective surface, located at one side of the bottom surface corresponding to the second side of the first active area, and inclining towards the second display panel in a direction away from the bottom surface; and
a second reflective surface, located at one side of the bottom surface corresponding to the fourth side of the second active area, and inclining towards the first display panel in a direction away from the bottom surface, wherein
after entering the first light entrance surface, the first auxiliary image is transmitted to the first reflective surface, and is then reflected outside one side of the first main image corresponding to the second side of the first active area via the first reflective surface; after entering the second light entrance surface, the second auxiliary image is transmitted to the second reflective surface, and is then reflected outside one side of the second main image corresponding to the fourth side of the second active area via the second reflective surface.

16. The mosaic display device according to claim 15, wherein the light transmission layer comprises a top surface opposite to the bottom surface, the first auxiliary image is reflected to one side of the first main image corresponding to the second side of the first active area via the first reflective surface and is output via the top surface together with the first main image; and the second auxiliary image is reflected to one side of the second main image corresponding to the fourth side of the second active area via the second reflective surface and is output via the top surface together with the second main image.

17. The mosaic display device according to claim 15, wherein the first auxiliary image is output from the first auxiliary area, and then directly enters the first light entrance surface in an inclined manner; and the second auxiliary image is output by the second auxiliary area and then directly enters the second light entrance surface in an inclined manner.

18. The mosaic display device according to claim 15, wherein curved surfaces of the two reflectors opposite to the first auxiliary area and the second auxiliary area are all concave.

19. The mosaic display device according to claim 15, further comprising an image processing module, wherein the image processing module
receives an original image signal;
cuts the original image signal into a first main image signal, a second main image signal, a first sideband image signal whose image location corresponds to an outside of one side of the first main image signal corresponding to the second side of the first active area, and a second sideband image signal whose image location corresponds to an outside of the second main image signal corresponding to fourth side of the second active area; and
transfers the first main image signal, the second main image signal, the first sideband image signal, and the second sideband image signal to the first active area, the second active area, the first auxiliary area, and the second auxiliary area respectively to generate the first main image, the second main image, the first auxiliary image, and the second auxiliary image respectively.

20. The mosaic display device according to claim 19, wherein the image processing module rearranges the image location of the first sideband image signal outside one side of the first main image signal corresponding to the first side of the first active area, and rearranges the image location of the second sideband image signal outside one side of the second main image signal corresponding to the third side of the second active area, to recombine the first main image signal, the second main image signal, the first sideband image signal, and the second sideband image signal into a recombined image signal, and outputs the recombined image signal to the first display panel and the second display panel.

* * * * *